United States Patent [19]
Orlowsik, Jr. et al.

[11] Patent Number: 5,774,492
[45] Date of Patent: Jun. 30, 1998

[54] LOW-COMPLEXITY DIRECT CONVERSION RECEIVER FOR DELAY-AND-CORRELATE TRANSMITTED REFERENCE SIGNALING

[75] Inventors: Eugene Joseph Orlowsik, Jr., Scotia; John Anderson Fergus Ross, Schenectady, both of N.Y.

[73] Assignee: General Electric Company, Schenectady, N.Y.

[21] Appl. No.: 691,253

[22] Filed: Aug. 2, 1996

[51] Int. Cl.⁶ .................................................. H04B 1/707
[52] U.S. Cl. .......................................... 375/206; 375/200
[58] Field of Search ................................... 375/200, 202, 375/206–210, 343, 367; 370/342, 47.9

[56] References Cited

U.S. PATENT DOCUMENTS

| | | | |
|---|---|---|---|
| 4,969,159 | 11/1990 | Belcher et al. | 375/207 |
| 5,243,622 | 9/1993 | Lux et al. | 375/206 |
| 5,278,864 | 1/1994 | Mori et al. | 375/208 |
| 5,353,301 | 10/1994 | Mitzlaff | 375/200 |
| 5,559,828 | 9/1996 | Armstrong et al. | 375/200 |

*Primary Examiner*—Young T. Tse
*Attorney, Agent, or Firm*—Marvin Snyder; Douglas E. Stoner

[57] ABSTRACT

A direct conversion receiver for a delay-and-correlate transmitted reference spread spectrum signaling method and apparatus is based on minimal component digital circuitry instead of analog delay and multiplier circuits. The method allows direct RF to baseband conversion and eliminates the need for an IF stage. The receiver includes an RF converter for converting a received direct sequence spread spectrum signal to baseband. An analog-to-digital converter samples the baseband signal at a rate greater than the chipping rate of the direct sequence spread spectrum signal. A delay stage coupled to the output of the analog-to-digital converter generates a delayed signal. Multiplier logic receives output signals from the analog-to-digital converter and the delay stage and, in response, generates control output signals. A counter responsive to the control output signals increments or decrements a count or recycles, depending on the decoded control output signals.

12 Claims, 3 Drawing Sheets

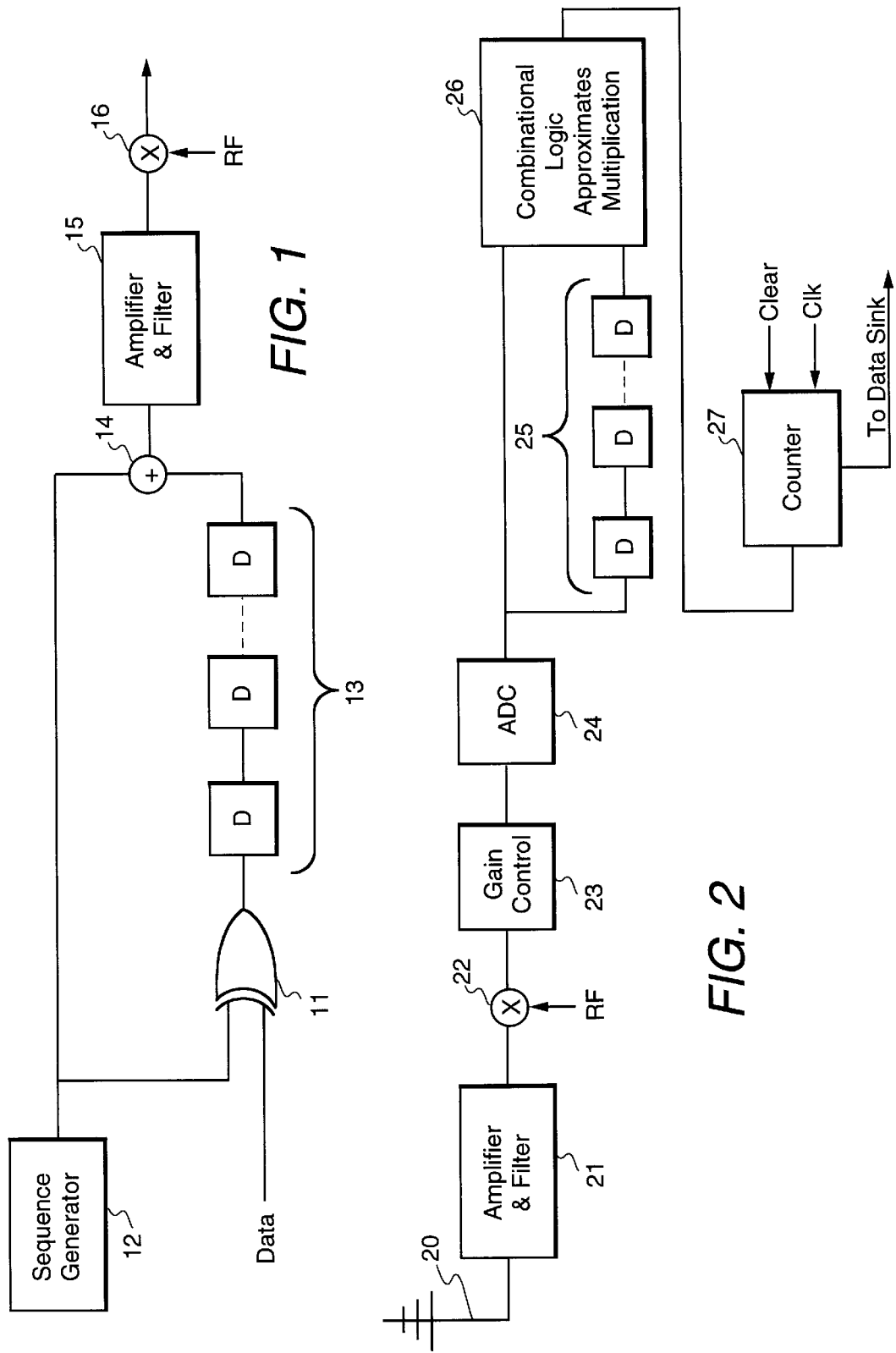

LOW-COMPLEXITY DIRECT CONVERSION RECEIVER FOR DELAY-AND-CORRELATE TRANSMITTED REFERENCE SIGNALING

BACKGROUND OF THE INVENTION

1. Field of the Invention

This invention relates to spread spectrum communications systems and, more particularly, to a low-complexity transmitted reference spread spectrum communications receiver.

2. Description of the Prior Art

Spread spectrum communications offer several advantages in communications applications requiring high reliability. These include low density power spectra and interference rejection. In the case of interference rejection, the interference may be accidental, that is, simply part of the environment of the communication system. In a specific application, the communications environment may include many potential reflectors, giving rise to severe multipath interference. Such multipath interference typically insinuates deep nulls in the form of frequency selective fading. Spread spectrum communications is an ideal countermeasure to this difficulty.

There are several types of spread spectrum systems including direct sequence digital systems, frequency hopping systems, time hopping systems, pulsed frequency modulated (or chirp) systems, and various hybrids. Of these, the direct sequence digital systems and frequency hopping systems are perhaps the more widely implemented. In a direct sequence digital system, a pseudorandom code generator is used to modulate a frequency modulated carrier. In a frequency hopping system, a coherent local oscillator is made to jump from one frequency to another.

Direct sequence spread spectrum modulation involves a wideband signal modulated by a narrowband message signal. A conventional implementation is to generate a wideband signal by means of a high speed shift register of n-stages with modulo-two feedback according to a primitive polynomial. The high speed digital sequence is then supplied to a balanced modulator whose other input signal is a narrowband carrier. The output signal of the balanced modulator is a wideband signal sometimes referred to as a "wideband carrier".

Spread spectrum communications are often asymmetric in cost and complexity. For example, suitable spread spectrum signals may be generated with relatively low complexity circuitry. The challenge is then how to accomplish demodulation of such signals. Usually, it is necessary to construct a demodulator which can generate or otherwise process a wideband signal in order to recover the narrowband message. Synchronization is often the most difficult and costly aspect of a spread spectrum communications system.

In order to simplify the receiver in a spread spectrum communications system, it is known to transmit a reference that may be used in place of synchronization and tracking at the receiver; that is, the coded reference is generated and transmitted with the intended information signal. Since the local reference is generated at the transmitter, the receiver need not have a code sequence or other local reference generator.

The present invention relates to the direct sequence digital type of spread spectrum communications system using a transmitted reference. A delay-and-correlate receiver is used to achieve synchronization. A mathematical model of a delay-and-correlate receiver suggests use of analog delay and multiplier circuits which would account for a significant fraction of the receiver cost. A description of the direct sequence digital type of spread spectrum communications system, as well as other types of spread spectrum communications systems, may be found, for example, in *Spread Spectrum Systems*, 3rd Ed., by Robert C. Dixon, John Wiley & Sons (1994), and *Spread Spectrum Communications*, Vol. II, by M. K. Simon et al., Computer Science Press (1985).

SUMMARY OF THE INVENTION

An object of the invention is to provide a method and apparatus which will reduce the complexity, and hence the cost, of a delay-and-correlate receiver for a spread spectrum communication system.

The invention eliminates the need for a local reference by transmitting a reference that the receiver can use to perform despreading. The method and apparatus of the invention is in the class of systems known as "transmitted reference" spread spectrum systems. In general, a transmitted reference system sends both a message signal and a reference signal to the receiver. The message signal contains the information to be communicated, which has been spread through multiplication with a wide band "spreading waveform". The reference signal consists of the spreading waveform itself, which the receiver can use to despread the message signal and recover the information.

The method and apparatus of the invention are implemented with minimal component digital circuitry, which replaces the analog delay and multiplier circuits. The method allows direct RF (radio frequency) to baseband conversion, and thus also eliminates the need for an IF (intermediate frequency) stage. The direct conversion receiver for delay-and-correlate transmitted reference spread spectrum signaling comprises an RF converter for converting a received direct sequence spread spectrum signal to baseband. An analog-to-digital converter samples the baseband signal at a rate greater than the chipping rate of the direct sequence spread spectrum signal. A delay stage coupled to the output of the analog-to-digital converter delays the sampled signal. Multiplier logic receives output signals from the analog-to-digital converter and the delay stage and generates control output signals. A counter responsive to the control output signals increments or decrements a count or recycles, depending on the decoded control output signals.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

FIG. 1 is a block diagram of a transmitter typically employed with the invention;

FIG. 2 is a block diagram of the receiver according to the invention;

DETAILED DESCRIPTION OF A PREFERRED EMBODIMENT OF THE INVENTION

Figure 3:
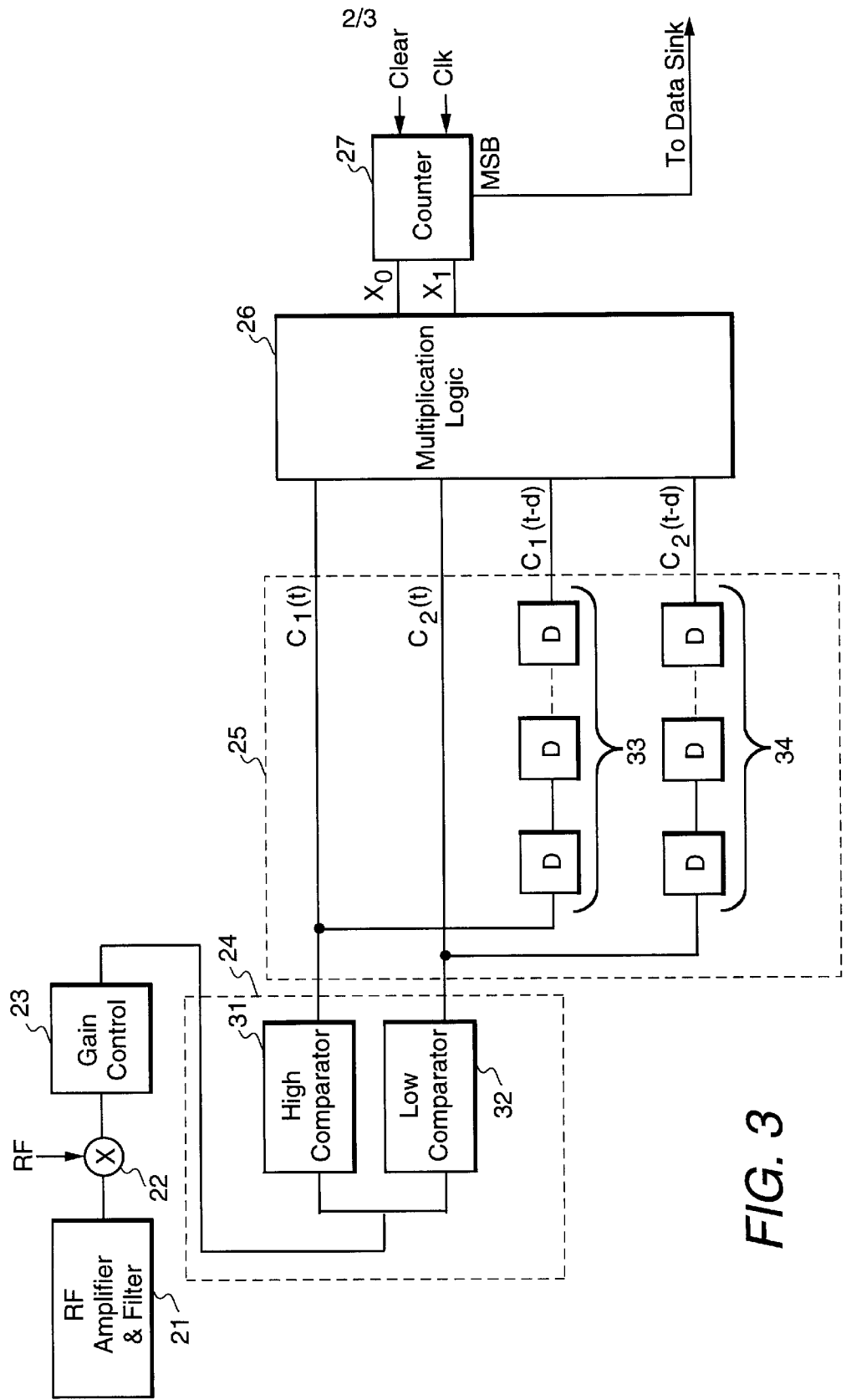
FIG. 3 is a block diagram of the receiver illustrated in FIG. 2, showing in more detail the simple analog-to-digital converter.

FIG. 1 illustrates a transmitter which is typically employed with the invention. Data are applied to one input of an Exclusive OR (XOR) gate 11, and a pseudorandom code generated by a sequence generator 12 is applied to a second input of XOR gate 11. The output signal of XOR gate 11 is supplied to an n-stage shift register 13 which provides the signal with a known delay. In an adder 14, the delayed signal from shift register 13 is added to the code produced by sequence generator 12, and the summed signal is supplied to an amplifier and filter 15. The output signal produced by amplifier and filter 15 is mixed with an RF signal from a local oscillator (not shown) in a mixer 16 to generate the transmitted signal.

The receiver according to the invention is shown in FIG. 2. The received signal from antenna 20 is supplied to an RF amplifier and filter 21. After amplification and passband filtering, the received signal is directly converted to baseband by a mixer 22. The baseband signal is supplied to a gain control 23, the output signal of which is sampled at a rate greater than the chipping rate by an analog-to-digital converter (ADC) 24. A simple ADC may be used as there are only three different transmitted levels. Because there generally is some offset between the transmitter local oscillator and the receiver local oscillator (not shown) providing an RF signal to mixer 22, the baseband signal is likely to be sine wave modulated. The oscillator offset is designed to be much less than the chipping rate, however, so that the sign change that occurs at the zero crossing of the sine wave affects only a small percentage of the samples to a delay-and-correlate device comprised of a delay path 25 and a multiplier circuit 26. Delay path 25 is implemented by a shift register made up of series of flip-flops triggered by a local receiver clock (not shown), providing a total delay very close to that of shift register 13 of the transmitter shown in FIG. 1. The output signals of ADC 24 and delay line 25 are supplied to multiplier circuit 26. True signal multiplication is approximated by a simple combinational circuit. The output signal of multiplier circuit 26 is supplied to a counter 27 which increments, decrements, or remains unchanged, according to the output signal of the multiplier circuit. At the end of each message symbol, the most significant bit of the counter determines whether a "0" or a "1" was sent. Counter 27 is then cleared to 00 . . . 0 for the next message symbol.

Figure 4:
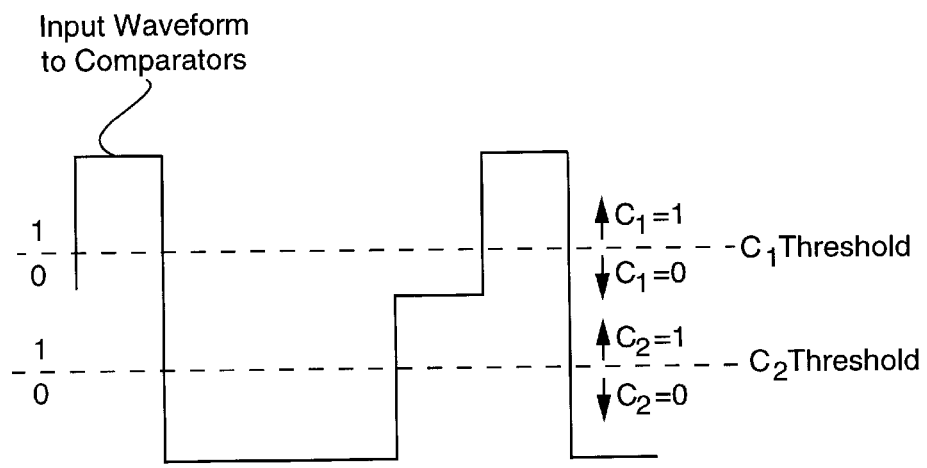
FIG. 4 illustrates the comparator output signals for a sample input waveform.

As the transmitted baseband signal utilizes only three different levels, the circuit depicted in FIG. 3 illustrates a particularly simple ADC 24 implementation. Two comparators 31 and 32 perform the analog-to-digital conversion, and the delay path 25 requires only two parallel delay lines 33 and 34, implemented by a series of flip-flops. The output signals of comparators 31 and 32 are designated $C_1(t)$ and $C_2(t)$, respectively, each signal being a function of time t, and the output signals of delay lines or shift registers 33 and 34 are designated $C_1(t-d)$ and $C_2(t-d)$, respectively, d representing the net delay of the shift registers. FIG. 4 shows the waveforms and high and low thresholds $C_1$ and $C_2$, respectively. Multiplication logic 26 generates output signals $X_0$ and $X_1$ which control counter 27 to increment, decrement or recycle (i.e., do nothing). A truth table for the multiplier logic 26 is shown below:

Multiplication Logic Truth Table

| $C_1(t)$ | $C_2(t)$ | $C_1$ (t-d) | $C_2$ (t-d) | $C_1 C_1$ (t-d) | $C_2 C_2$ (t-d) | $C_1$ (t-d) $C_2$ (t-d) | $C_1$ (t-d) $C_2$ (t-d) | $C_1$ (t-d) | $C_2$ (t-d) |
|---|---|---|---|---|---|---|---|---|---|
|   |   |   |   | 0 | 1 | 1 | 0 |   |   |
|   |   | 0 | 0 | Recycle | Not Possible | 1 | 1 |
| 0 | 0 | 1 | 1 | 0 | X | X | X | 1 | 0 |
| 0 | 1 | 0 | X | 0 | X | X | X | 0 | X |
| 1 | 0 | X | X | X | X | X | X | X | X |
| 1 | 1 | 1 | 0 | 0 | X | X | X | 1 | 1 |

In the above truth table the output signal X may be termed "don't care" since it can have any one of three states; increment, decrement or recycle (i.e., do nothing). These three states are represented according to the following table:

|  | $X_0$ | $X_1$ |
|---|---|---|
| Increment | 1 | 1 |
| Decrement | 1 | 0 |
| Recycle | 0 | X |

The output state is recycle whenever $X_0=0$. These input signals are provided to counter 27 which decodes the commands.

The truth table for the $X_0$ generation logic is shown below:

$X_0$

| $C_1$ | $C_2$ | $C_1(d)$ 0 | $C_2(d)$ 0 | $C_1(d)$ 0 | $C_2(d)$ 1 | $C_1(d)$ 1 | $C_2(d)$ 0 | $C_1(d)$ 1 | $C_2(d)$ 1 |
|---|---|---|---|---|---|---|---|---|---|
| 0 | 0 | 1 |   | X |   | X |   | 0 |   |
| 0 | 1 | X |   | X |   | X |   | X |   |
| 1 | 0 | X |   | X |   | X |   | X |   |
| 1 | 1 | 0 |   | X |   | X |   | 1 |   |

Figure 5:
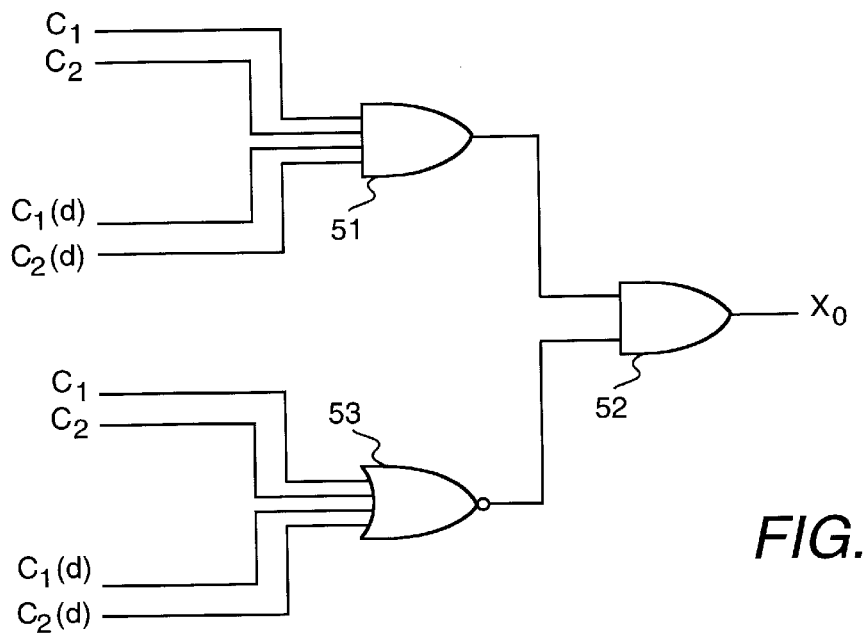
FIG. 5 is a logic diagram of a circuit which generates one part of the input signal to the counter.

FIG. 5 is the logic diagram of the circuit implementing the truth table for $X_0$. As can be seen, a minimal number of gates are required for this implementation; specifically, two AND gates 51 and 52 and one NOR gate 53. AND gate 51 receives the input signals $C_1$, $C_2$, $C_1(d)$, and $C_2(d)$ to generate the logical output signals $C_1 \cdot C_2 \cdot C_1(d) \cdot C_2(d)$. NOR gate 53 receives the same input signals to generate the logical output signals $\overline{C_1} \cdot \overline{C_2} \cdot \overline{C_1(d)} \cdot \overline{C_2(d)}$. These two output signals are combined in AND gate 52 to generate $X_0$.

The truth table for the $X_1$ generation logic is shown below:

$X_1$

| $C_1$ | $C_2$ | $C_1(d)$ 0 | $C_2(d)$ 0 | $C_1(d)$ 0 | $C_2(d)$ 1 | $C_1(d)$ 1 | $C_2(d)$ 0 | $C_1(d)$ 1 | $C_2(d)$ 1 |
|---|---|---|---|---|---|---|---|---|---|
| 0 | 0 | 1 |   |   | 0 | X |   | 1 |   |
| 0 | 1 | 0 |   |   | 0 | X |   | 0 |   |
| 1 | 0 | X |   | X |   | X |   | X |   |
| 1 | 1 | 1 |   |   | 0 | X |   | 1 |   |

Figure 6:
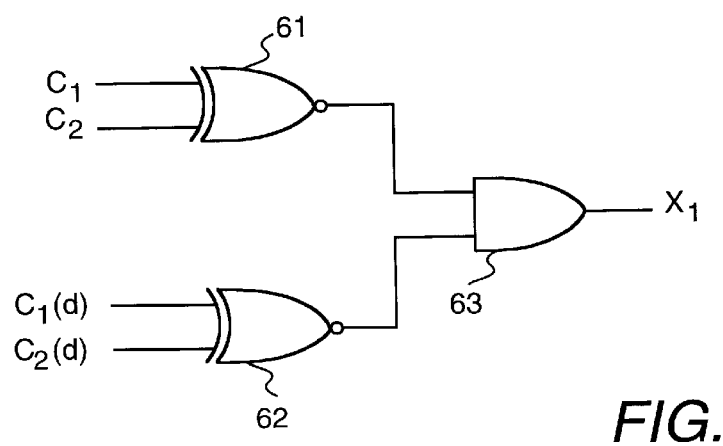
FIG. 6 is a logic diagram of a circuit which generates another part of the input signal to the counter.

FIG. 6 is the logic diagram of the circuit implementing the truth table for $X_1$. As can be seen, a minimal number of gates are required for this implementation; specifically, two Exclusive NOR gates 61 and 62 and one AND gate 63. Exclusive NOR gate 61 receives input signals $C_1$ and $C_2$ and generates the output signals $C_1 \cdot C_2 + \overline{C_1} \cdot \overline{C_2}$, and Exclusive NOR gate 62 receives the input signals $C_1(d)$ and $C_2(d)$ and generates the output signals $C_1(d) \cdot C_2(d) + \overline{C_1(d)} \cdot \overline{C_2(d)}$. These two output signals are supplied to AND gate 63 which generates $X_1$ as the output signal.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A direct conversion receiver for delay-and-correlate transmitted reference spread spectrum signaling, comprising:
    means for converting a received direct sequence spread spectrum signal having a predetermined chipping rate to a baseband signal;
    an analog-to-digital converter for sampling the baseband signal at a rate greater than the chipping rate of the direct sequence spread spectrum signal;
    delay means coupled to the analog-to-digital converter output for generating a delayed signal;
    multiplier logic for receiving output signals from said analog-to-digital converter and said delay means and for generating control output signals; and
    a counter responsive to said control output signals for incrementing or decrementing a count or recycling.

2. The direct conversion receiver for delay-and-correlate transmitted reference spread spectrum signaling recited in claim 1 wherein said analog-to-digital converter samples only three different transmitted levels.

3. The direct conversion receiver for delay-and-correlate transmitted reference spread spectrum signaling recited in claim 2 wherein said analog-to-digital converter comprises a high comparator and a low comparator, respectively, for comparing the baseband signal to high and low thresholds.

4. The direct conversion receiver for delay-and-correlate transmitted reference spread spectrum signaling recited in claim 3 wherein said delay means comprises identical parallel first and second delay stages, said first delay stage being coupled to receive an output signal from said high comparator and the second delay stage being coupled to receive an output signal from said low comparator, and wherein input signals to said multiplier logic comprise an output signal $C_1$ of said high comparator, an output signal $C_2$ of said low comparator, an output signal $C_1(d)$ of said first delay stage, and an output signal $C_2(d)$ of said second delay stage.

5. The direct conversion receiver for delay-and-correlate transmitted reference spread spectrum signaling recited in claim 4 wherein the control signals produced by said multiplier logic are represented by first and second control signals $X_0$ and $X_1$, respectively, and said counter performs in response to the control signals as follows:

|           | $X_0$ | $X_1$ |
|-----------|-------|-------|
| Increment | 1     | 1     |
| Decrement | 1     | 0     |
| Recycle   | 0     | X     | where the output state is Recycle whenever $X_0=0$, and X represents any state.

6. The direct conversion receiver for delay-and-correlate transmitted reference spread spectrum signaling recited in claim 5 wherein the multiplier logic includes $X_0$ generation logic defined by the truth table:

$X_0$

| $C_1$ | $C_2$ | $C_1(d)$ 0 | $C_2(d)$ 0 | $C_1(d)$ 0 | $C_2(d)$ 1 | $C_1(d)$ 1 | $C_2(d)$ 0 | $C_1(d)$ 1 | $C_2(d)$ 1 |
|---|---|---|---|---|---|---|---|---|---|
| 0 | 0 | 1 | | X | | X | | 0 | |
| 0 | 1 | X | | X | | X | | X | |
| 1 | 0 | X | | X | | X | | X | |
| 1 | 1 | 0 | | X | | X | | 1 | |

7. The direct conversion receiver for delay-and-correlate transmitted reference spread spectrum signaling recited in claim 6 wherein said $X_0$ generation logic comprises:
    a first AND gate for receiving as input signals $C_1$, $C_2$, $C_1(d)$, and $C_2(d)$ for generating a logical output signal $C_1 \cdot C_2 \cdot C_1(d) \cdot C_2(d)$;
    a NOR gate for receiving as input signals $C_1$, $C_2$, $C_1(d)$, and $C_2(d)$ for generating a logical output signal $\overline{C_1} \cdot \overline{C_2} \cdot \overline{C_1(d)} \cdot \overline{C_2(d)}$; and
    a second AND gate for receiving the output signals of the first AND gate and the NOR gate to generate the first control signal $X_0$.

8. The direct conversion receiver for delay-and-correlate transmitted reference spread spectrum signaling recited in claim 5 wherein the multiplier logic includes the second control signal $X_1$ generation logic defined by the truth table:

$X_1$

| $C_1$ | $C_2$ | $C_1(d)$ 0 | $C_2(d)$ 0 | $C_1(d)$ 0 | $C_2(d)$ 1 | $C_1(d)$ 1 | $C_2(d)$ 0 | $C_1(d)$ 1 | $C_2(d)$ 1 |
|---|---|---|---|---|---|---|---|---|---|
| 0 | 0 | 1 | | 0 | | X | | 1 | |
| 0 | 1 | 0 | | 0 | | X | | 0 | |
| 1 | 0 | X | | X | | X | | X | |
| 1 | 1 | 1 | | 0 | | X | | 1 | |

9. The direct conversion receiver for delay-and-correlate transmitted reference spread spectrum signaling recited in claim 8 wherein said second control signal $X_1$ generation logic comprises:
    a first Exclusive NOR gate for receiving as input signals $C_1$ and $C_2$ and generating an output signal $C_1 \cdot C_2 + \overline{C_1} \cdot \overline{C_2}$;
    a second Exclusive NOR gate for receiving as input signals $C_1(d)$ and $C_2(d)$ and for generating as an output signal $C_1(d) \cdot C_2(d) + \overline{C_1(d)} \cdot \overline{C_2(d)}$; and
    an AND gate for receiving the output signals of the first and second Exclusive NOR gate and for generating the output signal $X_1$.

10. A delay-and-correlate transmitted reference spread spectrum communications system comprising:
    a transmitter including
        a sequence generator for generating a spreading signal,
        an Exclusive OR gate for receiving a data input and said spreading signal,
        a first delay means coupled to an output of the Exclusive OR gate for generating a first delayed signal,
        a summer for combining said spreading signal with said first delayed signal, and
        an RF transmitter for transmitting a combined output signal from the summer; and a receiver including
- means for converting a received direct sequence spread spectrum signal having a predetermined chipping rate to a baseband signal,
- an analog-to-digital converter for sampling the baseband signal at a rate greater than said chipping rate,
- a second delay means coupled to the output of the analog-to-digital converter for generating a delayed signal,
- multiplier logic for receiving output signals from said analog-to-digital converter and said second delay means and for generating control output signals, and
- a counter responsive to said control output signals for incrementing or decrementing a count or recycling.

11. The delay-and-correlate transmitted reference spread spectrum communications system recited in claim 10 wherein said first and second delay means comprise first and second shift registers, respectively, having substantially the same delays.

12. The delay-and-correlate transmitted reference spread spectrum communications system recited in claim 11 wherein said analog-to-digital converter comprises a high comparator and a low comparator, for comparing the baseband signal to high and low thresholds, respectively.

\* \* \* \* \*